United States Patent [19]

Davis et al.

[11] Patent Number: 5,084,176
[45] Date of Patent: Jan. 28, 1992

[54] VIBRATING FILTER

[75] Inventors: Scott J. Davis, Kalamazoo; Kenneth P. Grantham, Schoolcraft; John W. Rishel, Vicksburg, all of Mich.

[73] Assignee: Delaware Capital Formation, Inc., Wilmington, Del.

[21] Appl. No.: 492,768

[22] Filed: Mar. 9, 1990

[51] Int. Cl.⁵ .............................................. B01D 29/72
[52] U.S. Cl. .................................... 210/350; 210/384; 210/388; 209/366.5; 209/367; 209/381
[58] Field of Search ................ 209/366.5, 367, 381; 210/350, 384, 388, 332, 339, 383

[56] References Cited

U.S. PATENT DOCUMENTS

| | | | |
|---|---|---|---|
| 2,167,236 | 7/1939 | Gieseler | 183/58 |
| 3,212,643 | 10/1965 | Schmidt et al. | 210/332 |
| 3,692,178 | 9/1972 | Reece | 210/82 |
| 3,747,765 | 7/1973 | Nowak | 210/238 |
| 3,870,640 | 3/1975 | Reece | 210/388 |
| 4,289,630 | 9/1981 | Schmidt et al. | 210/785 |
| 4,517,086 | 5/1985 | Romey et al. | 210/388 |
| 4,741,841 | 5/1988 | Borre et al. | 210/388 |
| 4,753,257 | 6/1988 | Gauriel et al. | 210/384 |
| 4,804,481 | 2/1989 | Lennartz | 210/791 |
| 4,836,922 | 6/1989 | Rishel et al. | 210/232 |

FOREIGN PATENT DOCUMENTS 210213A 9/1982 German Democratic Rep. .

OTHER PUBLICATIONS

Rosedale Sieving Filter Brochure—Catalog SF 1M1088.

Primary Examiner—Robert A. Dawson
Assistant Examiner—Wanda L. Millard
Attorney, Agent, or Firm—Flynn, Thiel, Boutell & Tanis

[57] ABSTRACT

A vibrating filter has a housing, top and bottom plates spaced vertically in an upper portion of the housing and defining an outlet chamber therebetween, at least one filter element dependent from the bottom plate into a filter chamber defined in the housing below the outlet chamber and a process liquid inlet into the filter chamber and a filtered liquid outlet from the outlet chamber. A vibrator containing an eccentrically movable mass, abuts and is energizable directly through the top plate, without need for energizing hoses or conduits within the outlet chamber. The vibrator connects by a slim depending member to the bottom plate carrying the filter elements.

18 Claims, 4 Drawing Sheets

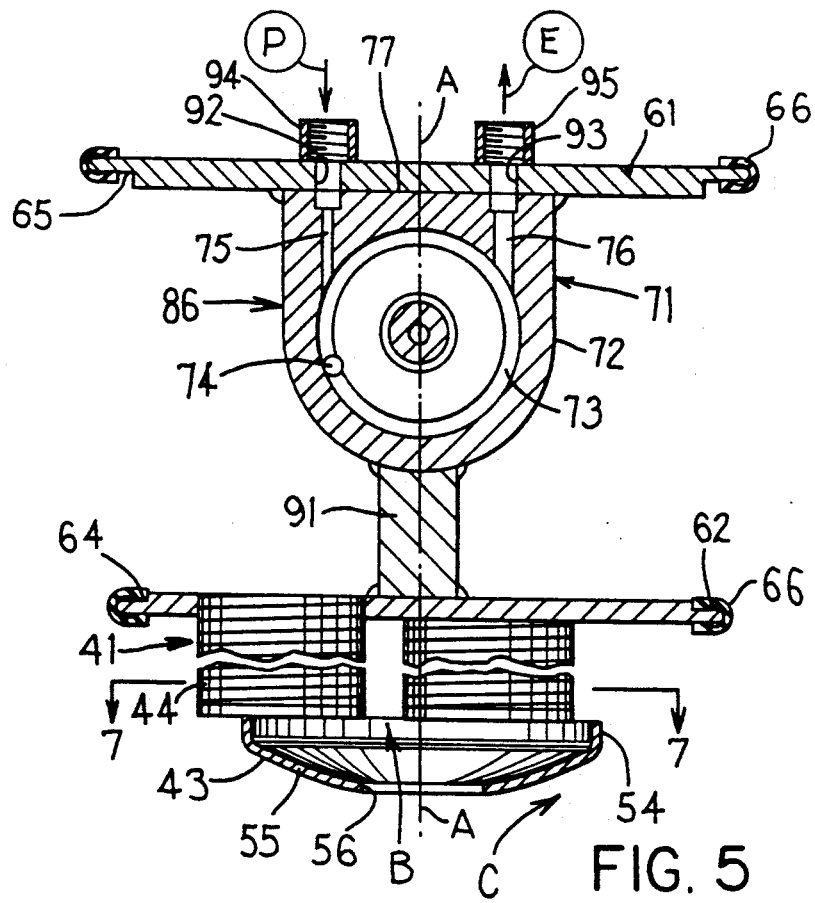
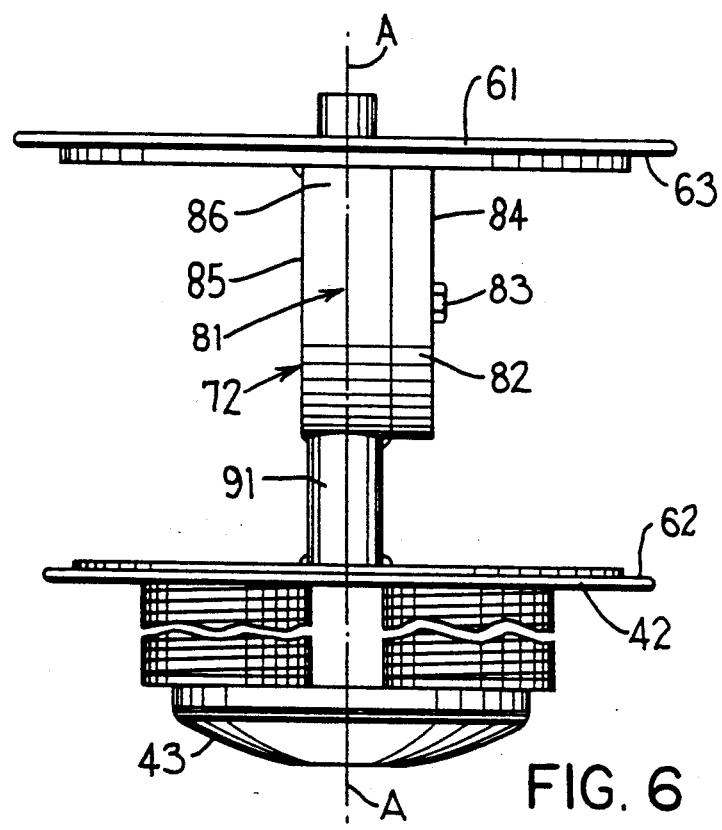

VIBRATING FILTER

FIELD OF THE INVENTION

This invention relates to a vibrating filter of the kind having a filter element and a vibrator disposed within a filter housing.

BACKGROUND OF THE INVENTION

The assignee of the present invention has, for a number of years, built lines of industrial pressure liquid filters including a compressed gas-powered vibrator unit within the filter housing. A number of patents have been issued to the present assignee in connection with filters of this type.

For example, U.S. Pat. No. 3,692,178, assigned to the assignee of the present invention, provides a compressed air powered vibrator suspended by elongate air input and output noses low in the filter housing, just below the bottom of the filter element, for agitating the processed liquid to be filtered within such housing.

A later U.S. Pat. No. 3,870,640, also assigned to the assignee of the present invention, shows development in which the vibrator is fixed to the bottom end of the filter element. The filter element depends from its top end, which is fixedly supported within the filter housing. In this instance, the vibrator actually vibrates the filter element to which it is attached and thereby is intended to inhibit the tendency of solids and the process liquid surrounding the filter element to cake on and block the filter element.

However, testing of the latter apparatus has shown that the vibrator tends to laterally vibrate the bottom end of the filter element to a substantially greater amplitude than the top end of the filter element, in a pendulum-like manner.

While satisfactory for most applications, if one were to use this filter unit in filtering liquids with extremely sticky solids content, such as modern automobile paints, the pendulum-like vibration characteristic of the filter element could risk a premature coating of the upper portion of the filter element. Further, care must be taken to mount the upper end of the filter element in a very robust manner to avoid mechanical fatigue to such mounting due to vibration over a period of use, in view of the support of the substantial weight of the vibrator dependently from the bottom of the filter element, if one needs to provide a relatively large vibration amplitude at the top of the filter element.

U.S. Pat. No. 4,836,922, also assigned to the assignee of the present invention, discloses a further development, namely a vibratorially self-cleaning filter unit particularly adapted to efficient filtering of liquids with sticky high solids content prone to clog the input side of the filter element. In particular, such filter has proven capable of efficient removal of unwanted solids from the high solids, sticky, viscous, high pigment finish coat paint now widely used in the automotive industry. In this patented filter unit, a filtered liquid outlet chamber is defined vertically between the cover of the filter housing and a plate spaced therebelow, from which plate depends the filter element or elements into the lower, inlet portion of the filter housing. The outlet chamber contains three evenly circumferentially spaced, vertical support rods that have tops welded to the bottom of the cover and bottoms welded to the top of the plate from which the filter elements depend. A vibrator comprises a housing closing a horizontal circular race, around which an inertia mass, for example a steel ball, is orbitable. The vibrator is fixed to the rods at a location between and spaced from each of the cover and plate. More particularly, the vibrator housing is shaped like a right circular cylinder snugly surrounded by and welded to the three support rods. An O-ring is disposed between the bottom of the plate and an upward facing step within the housing to enable the plate to carry out small amplitude horizontal vibration with respect to the housing. The orbiting inertia mass in the vibrator housing causes the vibrator housing to vibrate in a horizontal plane. The spacing of the vibrator below the fixed housing cover and the capability of the three support rods to flex with respect to the cover results in vibratory horizontal movement of the plate and relatively uniform horizontal vibratory motion of the filter elements along the vertical length thereof. In one successful embodiment, acceptable filter element vibration amplitude uniformity was obtained using relatively short filter elements, namely a trio of filter elements about 12 inches long with a diameter of $1\frac{1}{4}$ inch each. In one embodiment, satisfactory filtering and cleaning was obtained with a paint flow rate of 20-25 gallons per minute per square foot of filter element, through the filter unit. All in all, the performance of the patented apparatus as a filter for final coat paint of the mentioned type has been satisfactory.

A need exists, however, for an efficient self-cleaning filter for base coat of the type now used in the electrostatic dip coating of raw automotive vehicle bodies. This base coat has substantially different characteristics than the above-described finish coat. The E-coat has substantially less pigment than the finish coat paint, so there is less need to avoid pigment shear that might be caused by a vertical component of vibration of the filter elements. Particle size to be filtered out also differs, the lower limit being about 25 microns in the finish coat and about 50 microns in the base coat.

The base, or "E-coat" ("E" for electrostatically attracted) is a jelly-like material. It is high velocity sensitive and can thereby be stripped. Increasing flow restriction, either by raising velocity of flow or turning corners at high velocity tends to strip off parts of this gelatin-like material.

E-coat is also low velocity sensitive. Thus, once the filtered E-coat liquid leaves the filter element, applicant has found that the path out of the filter unit housing, from the filter element outlet to the housing outlet, should be kept as free as possible from obstructions, such as compressed gas supply and exhaust houses or vibrator support rods, and that the remaining obstructions in the flow path should be sized, shaped and located to minimize flow obstruction and dead zones, to provide a relatively smooth and open flow path from the filter element outlets to the housing outlet. Applicant has found that any pockets along the flow path should be shallow and shaped to provide some turbulence so that there is sufficient flow velocity therein as to prevent stagnation of filtered E-coat therein.

The gelatin-like consistency of the material is permitted due to the fact that it is not sprayed like a conventional paint, but rather is applied by dipping the vehicle bodies in a tank of the jelly-like material, wherein electrostatic means are provided to tightly and uniformly bond the gelatin-like E-coat to the vehicle bodies dipped in the tank.

It is particularly important that unwanted solids be filtered out of the E-coat in the tank because vehicle bodies remain immersed in the tank for a relatively long time, for example four hours, and failure to properly filter out impurities from the E-coat may not be discovered till after a vehicle body is removed from the tank, by which time several vehicle bodies may be blemished. Several vehicles are normally in the tank at one time, and tank size may run as high as 80,000 to 100,000 gallons. The E-coat and finish coat are relatively thin and thus small unwanted solids (hair, dirt particles, etc.) can noticeably blemish the final vehicle finish. This is not satisfactory and the E-coat must be efficiently filtered and thus maintained free of unwanted solids.

In view of the large size of the vehicle body dip bath, and the corresponding large volume of base coat liquid needed to fill it, the associated bank of filter units, sized to occupy a given space, must handle a higher flow rate during filtration than in the case of the final coat paint filter. At first glance, it would appear that the higher flow rates through a given filter unit could be obtained simply by upsizing the filter elements (increasing the diameter and length thereof) in the prior paint filter of the present assignee. However, applicant has determined that to do so would degrade the uniformity of vibration amplitude along the length of the filter elements and thereby degrade uniformity of vibratory cleaning of the filter elements along the lengths thereof. Further, applicant has determined that with the reduced pigment, and therefore with the reduced risk of pigment shear in the E-coat, by the outer surface of the vibrating paint filter element surface, cleaning efficiency could be enhanced by introduction of a modest amplitude of vertical vibration of the filter element, i.e., vibratory movement lengthwise of the filter elements, so as to create something of a shear effect between the circumferential windings of the filter element and solids adhering thereto.

In one embodiment of the present invention, applicant has achieved substantial increase in filtering flow per filter unit by increasing filter tube diameter and length (for example 2¼" diameter×24" length vs. 1¼" tube diameter×12" length in the prior paint filter), thereby allowing a substantially higher liquid filtration rate (about 300 gallons per minute vs. about 30 gallons per minute in the prior paint filter, per filter unit). The vibrator is upsized by a small amount as to ball diameter and orbit diameter, but with very little increase in pressure air input, for example 7 cubic feet per minute (CFM) vs. 5 CFM in the prior paint filter. This achieves filter element vibration amplitude of sufficient uniformity along the length of the filter element, of horizontal vibrational amplitude and achieves a modest vertical vibratory amplitude (in one embodiment up to 0.030 inch horizontal vibratory amplitude and about 0.001 inch vertical vibratory amplitude at a frequency of 2000 to 4000 Hz).

Accordingly, the objects and purposes of the invention include provision of a vibrating filter which is made compact by housing the vibrator in the filtered liquid outlet chamber of the filter housing, in which the vibrator and its connection to the filter elements are sized and shaped and located in the housing outlet chamber to minimize interference with flow of filtered liquid from said filter elements through and out of the outlet chamber, in which the outlet chamber is free of energy supply cables or conduits to the vibrator, in which liquids including relatively gelatin-like liquids (particularly including electrostatic dip bath base coats for vehicles) can be efficiently filtered for long periods of time without need to disassemble the filter unit for cleaning, which the vibrator and filter elements connected thereto are together resiliently mounted with respect to the housing and removable as a single cartridge unit from the housing, in which vibration in a longitudinal as well as lateral direction is applied to the filter elements, and in which the filter unit is readily manufactured at reasonable cost and capable of a long service life with little or no maintenance.

The objects and purposes of this invention are met by providing a vibrating filter having a housing, top and bottom plates spaced vertically in an upper portion of the housing and defining an outlet chamber therebetween, at least one filter element dependent from the bottom plate into a filter chamber defined in the housing below the outlet chamber and a process liquid inlet into the filter chamber and a filtered liquid outlet from the outlet chamber. A vibrator containing an eccentrically movable mass, abuts and is engergizable directly through the top plate, without need for energizing hoses or conduits within the outlet chamber. The vibrator connects by a slim depending member to the bottom plate carrying the filter elements.

Other objects and purposes of the invention will be apparent to persons acquainted with apparatus of this general type upon reading the present specification and inspecting the accompanying drawings.

BRIEF DESCRIPTION OF THE DRAWINGS

FIG. 5 is a fragment of FIG. 3 showing the vibrator/filter elements cartridge;

FIG. 6 is a fragmentary right side view of the FIG. 5 cartridge;

DETAILED DESCRIPTION

Figure 1:
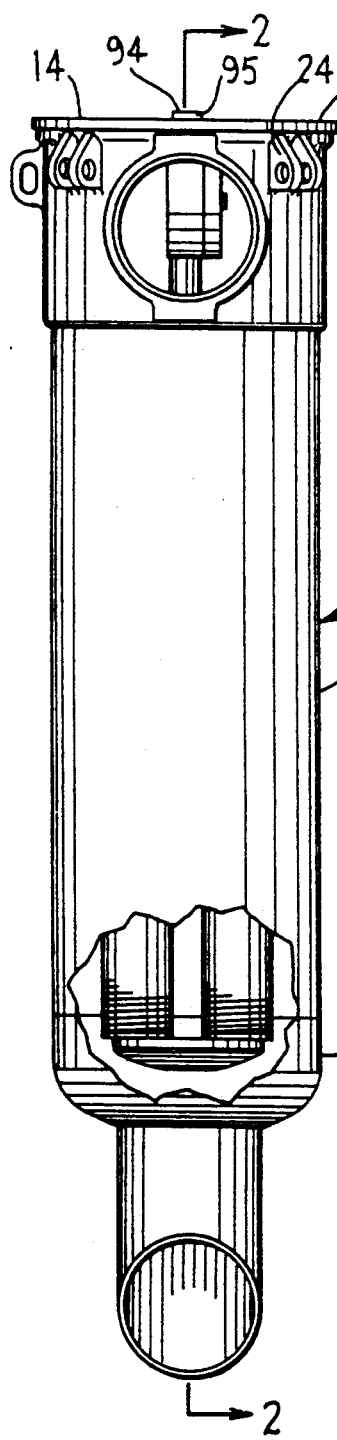
FIG. 1 is a side elevational view of a filter unit embodying the invention, taken from the outlet side thereof and with the filter housing partially broken away to show portions of the filter elements therein.

A vibrating filter apparatus 10 (FIGS. 1 and 2) comprises a housing 11. The open top of the housing 11 is selectively closable by a cover 14. The housing 11 has an upper chamber 16 and a lower chamber 17 (also referred to as the outlet chamber and filter chamber, respectively). Such chambers are enclosed by wall means, namely by a side wall 12 and bottom wall 13 of the housing 11, and by the cover 14.

Figure 2:
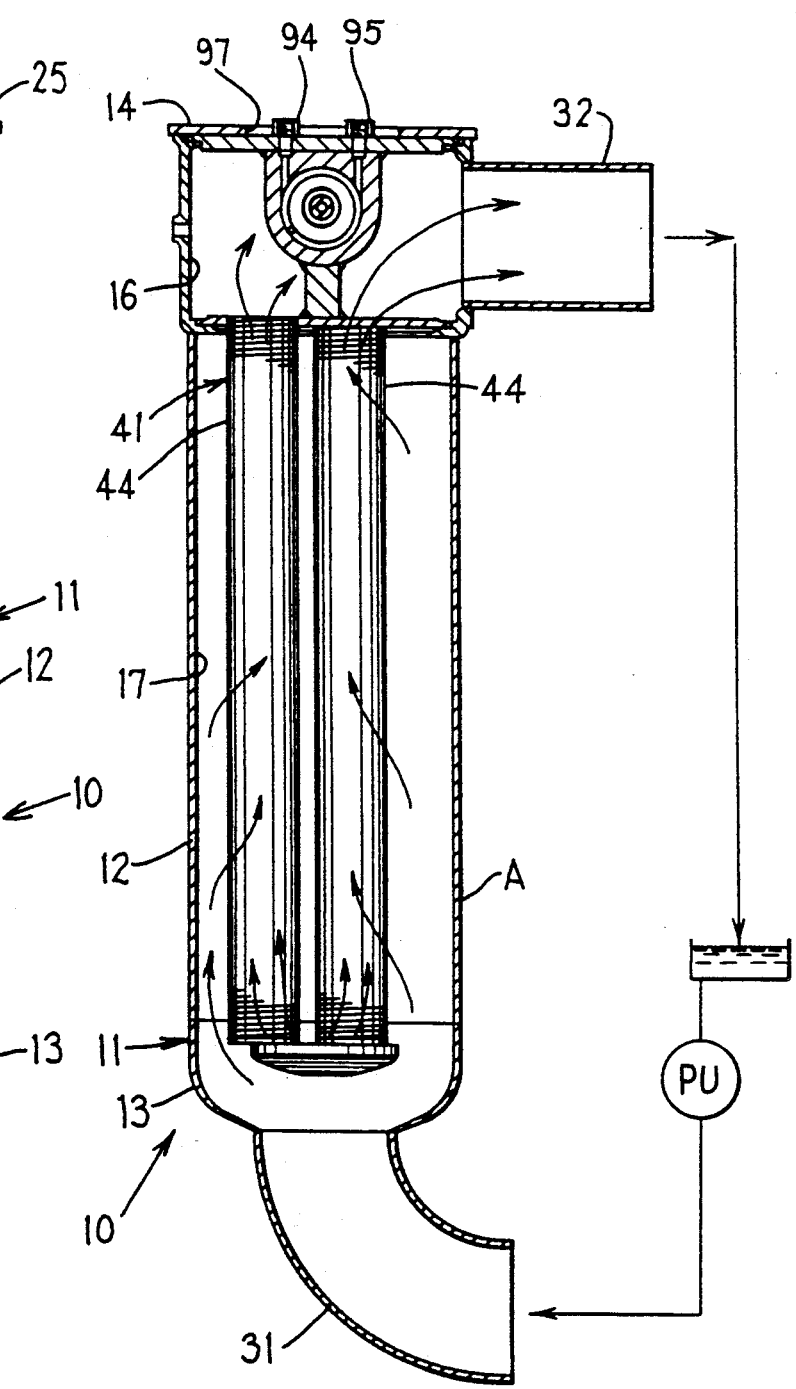
FIG. 2 is a central cross-sectional view substantially taken on the line II—II of FIG. 1.

The cover 14 is releasably held in place to seal the top of the housing by any convenient means, here for example by conventional threaded pivot toggles 21 (FIG. 1). Each toggle 21 comprises an eyebolt 22 pivoted at its lower end by a horizontal pivot pin 23 in a boss 24 protruding sidewardly from the top portion of the housing tubular side wall 12. The upper end of the eyebolt 22 is threaded and is pivotable upwardly into a slot 25 in the overhanging edge of the cover 14 to protrude upwardly therebeyond and threadedly receive a hand nut 26. Three similar toggles 21 are evenly circumferentially distributed on the housing 11. Tightening of the three hand nuts 26 downwardly onto the top of the cover 14 snugly secures the cover 14 downward against the upper end of the housing 11, and hence fixedly closes the upper end of the chamber 16. In each toggle 21, loosening of the nut 26 to a sufficient extent allows the eyebolt 22 to pivot radially outward about its pivot pin 23 and clear the slot 25. Doing so with each of the three toggles 21 allows the cover 14 to be lifted from the housing 11 for access to the interior of the latter.

A process liquid inlet 31 communicates through the bottom wall 13 of the housing 12 into the lower chamber 17 and a filtered liquid outlet 32 opens through the upper portion of the tubular side wall 12 into the upper chamber 16. The inlet 31 and outlet 32 are connectable in a liquid system (not shown) for filtering process liquid in a conventional manner.

A filter cartridge 41 (FIGS. 5 and 6) comprises at least one upstanding filter element 44. In the preferred embodiment shown, an array of three such filter elements 44 is provided, the filter elements extending vertically, and being circumferentially spaced around a common central axis indicated at A in FIGS. 5 and 6, such that the three filter elements 44 are at the apices of an equilateral triangle. By providing more than one filter element 44, it is possible to increase the surface area available for filtering without increasing the overall diameter of the filter cartridge, and an array of three such filter elements 44 has been found to be a particularly effective number. The spacing of the three filter elements 44 from each other permits process liquid to move between the filter elements and hence allows all the surfaces of the filter elements to carry out effective filtering. Such a triangular array of three filter elements has been known, the assignee of the present application having manufactured such an array under the trademark TRI-CLUSTER for a number of years. A plate 42 (hereafter the bottom plate 42) is fixed to the open tops of the filter elements 44 in a manner to allow filtered liquid to flow up through the open tops of the filter elements 44 into the upper chamber (outlet chamber) 16 (FIG. 1).

In the preferred embodiment shown, the plate 42 has an unrecessed opening 53 coaxial with each filter element 44 and into which the top portion of such filter element 44 is partially telescoped. The top portion of the opening 53 extends somewhat (for example, about ⅛ inch) above the top of the corresponding filter element 44 for receiving a weld bead 96 circumferentially continuously securing and sealing the top of the filter element 44 with respect to the plate 42. The plate 42 is thus rigidly joined to the tops of the plural filter elements 44 depending therefrom.

In the embodiment shown, the filter elements are of the conventional kind wherein a square or trapezoidal cross section metal rod 46 is wound in a circular manner around a plurality of upstanding, circumferentially spaced internal struts 47 and welded thereto to form a cylindrical, perforate filter element wall. The filter elements 44 are closed at their bottom ends as generally indicated at 48. A member 43, hereafter described in more detail, fixedly connects the bottoms of the three filter elements 44.

To the extent above described, the apparatus 10 is generally similar to that disclosed in above-mentioned U.S. Pat. No. 4,836,922, assigned to the assignee of the present invention. The present invention departs from that prior apparatus as hereafter discussed.

In accord with the present invention, the cartridge 41 has a bottom member 43 of generally shallow bowl-shaped configuration. More particularly, the member 43 has a shallow upstanding peripheral wall 54 (FIG. 5) of outer diameter intermediate the diameter of an imaginary circle snugly circumscribed around the outside of the three filter elements 44 and greater than an imaginary circle circumscribed by and within the confines of the three filter elements 44. The top of the peripheral edge 54 is welded to the bottom closure 48 of each of the filter elements 44. In the embodiment shown, the closure 48 is simply a metal plate which closes and is welded to the bottom of the corresponding filter element 44. The member 43 is upwardly concave and downwardly convex and has a shallow frustoconical wall 54 which extends toward the center of the member 43 from the bottom of the peripheral wall 54. The frustoconical wall 55 is provided with a center hole 56. In the embodiment shown, the hole 56 is slightly smaller in diameter than the outside diameter of the filter elements 44 (about 1¾ vs. 2¼). The hole 56 allows an upward flow of liquid therethrough, as indicated by the arrow B. The interior concavity of the frustoconical wall 55 helps to spread the upward flow radially outwardly from the edge of the hole 56 so as to more evenly distribute process liquid to be filtered over the circumference of each filter element 44. The convex bottom shape of the member 43 assists the outward spread of process liquid rising from the inlet 31, as generally indicated by the arrow C, again to assist the liquid to be filtered in spreading uniformly over the exterior surface of the filter elements 44.

While the cartridge 41 in the embodiment shown has three filter elements, it is contemplated that a greater or lesser number might be used, though preferably symmetrically arranged with respect to the central axis A of the cartridge 41.

Figure 9:
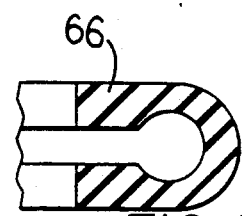
FIG. 9 is an enlarged fragmentary cross sectional view of an envelope seal of the type used on the perimeter of the top and bottom plates of FIG. 3.

In the embodiment shown, the cartridge 41 includes a top plate 61 (FIG. 5) spaced coaxially above the bottom plate 42 and defining therebetween the height of the outlet chamber (upper chamber) 16 (FIG. 1). In the embodiment shown, the peripheral edge portions 62 and 63 of the plates 42 and 61, respectively, are recessed, one such recess axially opposing the other, to form radially outward facing steps 64 and 65. Conventional, generally U cross section, envelope seals 66 (FIG. 9) of suitable resilient material, removably surround the recessed peripheral edge portions 62 and 63 of the respective plates 42 and 61. The resilient envelope seals 66 serve both as liquid seals and resilient mounts for the plates 42 and 61, as hereafter discussed.

A vibrator 71 has a rigid casing 72 (FIG. 5). While other types of eccentrically moving mass vibrators are contemplated, the preferred vibrator 71 is of the type having a substantially circular path 73 within the casing 72 along which an inertia mass, here a metal (such as stainless steel) ball 74 is energizable to orbit. It will be understood that the centrifugal force of the ball 74 as it orbits will tend to move the casing 72 in the plane of the path 73 and at a frequency corresponding to the rotation rate of the inertia mass 74. In the embodiment shown, it is energized to orbit by compressed gas, although other energy sources are contemplated. More particularly, in the embodiment shown, pressure gas inlet and exhaust passages 75 and 76 connect tangentially to the path 73, generally on opposite sides thereof, and open through a portion 77 of the periphery of the vibrator casing 72. The vibrator casing 72 comprises a body 81 (FIG. 6) having the path 73 and passages 75 and 76 recessed in one face (the rightward face in FIG. 6) thereof and covered by a cover plate 82, here secured to the body by a central screw 83.

In the preferred embodiment shown, the casing 72 has flat front and back faces 84 and 85 defining therebetween a relatively slim peripheral edge 86. In the preferred embodiment shown in FIGS. 5 and 6, the plane of the orbit path 73 is vertical, as are the inlet and exhaust passages 75 and 76. As seen in FIG. 5, the portion 77 of the casing periphery 86 is flat and abuts and is fixed by welding to the underside of the top plate 61 in the center thereof. The casing 72 depends from the top plate 61 along the central axis A of the cartridge 41. As it extends down from the top plate 61, the casing periphery 86 has relatively straight right and left sides, paralleling the inlet and exhaust passages 75 and 76, and the bottom of the casing periphery 86 is convexly rounded about the center of the path 73. A relatively slim center post 91 is preferably coaxial with the central axis A and extends downward from the bottom of the casing periphery 86 to abut the top of the bottom plate 42. The post is fixed, preferably by welding, at its top and bottom to the casing 72 and bottom plate 42, respectively.

The ends of the inlet and exhaust passages 75 and 76, which open through the flat, top peripheral portion 77 of the casing 72, communicate in sealed fashion via holes 92 and 93 through the top plate 61 with conventional pressure air fittings 94 and 95 fixed air tight atop the top plate 61, as by soldering or welding. The fittings 94 and 95 releasably connect respectively to a conventional compressed gas source P and exhaust path E. The compressed gas source P is preferably a compressed air source of the kind found in many industrial plants.

Except for the resilient edge seals 66, the component parts of the cartridge 41 are rigidly fixed together, preferably by welding.

Figure 8:
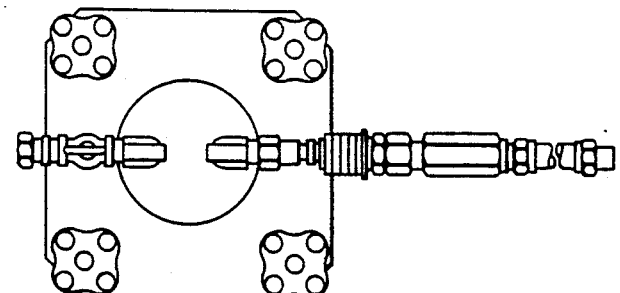
FIG. 8 is a top view of the apparatus of FIG. 3, taken substantially on the line VIII—VIII of FIG. 3.

Returning to the cover 14 (FIGS. 1, 2 and 8), same has a suitable opening or openings therethrough, through which the compressed gas fittings 94 and 95 loosely protrude. In the embodiment shown, the cover 14 is an annular disk and such opening or openings take the form of an enlarged central opening 97 (FIG. 1) through which the fittings 94 and 95 loosely protrude.

The housing 11 (FIG. 3) includes upward facing, radially inward extending bottom and top steps 76 and 77, at the bottom and top, respectively, of the circularly cylindrical upper chamber 16. The steps 76 and 77 are annular and preferably horizontal and are vertically spaced to sealingly engage and support the bottom surfaces of the envelope seals 66 on the peripheral edge portions 62 and 63 of the bottom and top plates 42 and 61, respectively (FIG. 5). The diameter of the annular bottom and top steps 76 and 77 is sufficient to radially accommodate the envelope seals 66 carried by the bottom and top plates 42 and 61, respectively. The bottom plate 42 is of diameter less than the minimum diameter of the top step 77, to allow insertion of the bottom plate 42 and its depending filter elements into the housing 12. When thus installed in the housing, the filter elements 44 occupy the lower (filter) chamber 17 and the bottom and top plates 42 and 61 define the top and bottom of the outlet chamber 16.

The cover 14 lies atop the top envelope seal 66. When the pivot toggles are swung up over the adjacent edge portions of the cover 14 and tightened, the cover 14 is pressed down against and in turn presses down against the top step 77 the upper envelope seal 66, at the same time pressing the lower envelope seal 66 downward against the bottom step 76. When the upper envelope seal 66 has been pressed sufficiently by the cover 14 to establish a liquid seal, further downward movement of the cover 14 is positively blocked by the upstanding rim 78 of the housing 12, which rim 78 extends up from the top step 77 at the radially outer extremity thereof.

OPERATION

The filter cartridge 41 is assembled by permanently together preferably by welding) the rigid components seen in FIG. 5. The envelope seals 66 then are resiliently snapped over the peripheral edge portions 62 and 63 of the bottom and top plates 42 and 61.

The filter cartridge 41 can be lowered into the open top of the housing 11. The filter elements 44 pass loosely down through the central opening of the annular bottom step 76 and into the filter chamber 17. The bottom plate 42 with its surrounding envelope seal 66 passes with a small clearance down through the central opening of the annular top step 77 and, with the post 91 and vibrator 71, enters the outlet chamber 16. Downward motion of the cartridge 41 ends with the bottom member 43 spaced above the bottom wall 13 of the housing 11 and the envelope seals 66 of the bottom and top plates 42 and 61 resting on the bottom and top steps 76 and 77, respectively.

The cover 14 is then placed coaxially upon the top plate 61 and the pivot toggles 21 are swung up into the corresponding slots in the top plate 14 and the nuts 26 are screwed down to press the cover down against the upper envelope seal 66 such that the top plate 61, vibrator casing 72 and post 91 press the bottom plate 42 and its envelope seal 66 down against the bottom step 76, until the cover 14 bottoms on the rim 78 of the housing. In this condition, envelope seals 66 are lightly compressed, sufficient to create a liquid seal preventing escape of filtered liquid out from under the cover 14 and to prevent mixing of filtered and non-filtered liquids past the bottom plate 42. In this fully installed condition, the envelope seals permit a degree of vibratory movement vertically and horizontally of the bottom and top plates 42 and 61, and thereby of the filter elements 44.

The fittings 94 and 95 are then connected to conventional pressure gas and exhaust means P and E. The liquid inlet and outlet 31 and 32 are connected to a source of liquid to be filtered and a point of use for filtered liquid. For example, the filter assembly 10 may be connected in loop with an automotive paint base coat tank T (FIG. 1) and pump means PU to circulate such base coat through the filter apparatus 10 and tank for removal of contaminant solids.

During operation, compressed gas from the inlet fitting 94 flows counter-clockwise (FIG. 5) through the bottom portion of the vibrator circular path 73, driving the inertia mass 74 before it, and exhausts out the exhaust fitting 95. Continued application of pressure gas in this manner maintains counter-clockwise orbiting of the inertia mass 74 eccentrically in the vibrator casing 72, thereby urging the vibrator casing to move in reaction to the centrifugal force of the orbiting mass 74. The vibrator casing 72 thereby tends to move in the plane of the orbital movement of the inertia mass 74 (here a vertical plane) in a corresponding orbital motion having both vertical and horizontal components. The fixed connection of the vibrator 71 to the post 91, plates 42 and 61 and filter elements 44 causes those elements to move vibratorally with the vibrator casing 72, as permitted by the resilient support of the peripheral edges of the plates 42 and 61 by the resilient envelope seals 66. The geometry and weight and relative placement of the elements of the filter cartridge affect the amplitude and direction of vibration at any given point thereon. In one unit constructed according to the invention, the horizontal amplitude of vibration of the filter elements 44 exceeded the vertical amplitude of vibration, but measurable vertical amplitude was present.

Care is taken in routing the flow of liquid through the apparatus 10. Incoming liquid to be filtered passes through the liquid inlet 31 (FIG. 2) and encounters the shallow bowl shaped member 43 fixed to the bottom of the filter elements 44. Even a liquid having the gelatin-like character of the above-described E-coat will divide smoothly with a portion guided along the convex exterior of the conical wall 55 and peripheral wall 54 and flow up along the exterior facing surfaces of the filter elements 44. The remainder of the flow passes through the central hole 56 in the bottom member 43, a portion of it passing straight upward and a portion following along the upward facing interior conical wall 55 and peripheral wall 54 to contact the interior facing portions of the upstanding filter elements 44. In this way, relatively even distribution of process liquid to be filtered, over the surface of the filter elements 44, is achieved.

As the incoming liquid is filtered by passing in through the porous side walls of the filter elements 44, unwanted solids are filtered out and tend to coat and blind the exterior surfaces of the filter elements 44. This effect is greatly reduced by the vibration of the filter elements by the vibrator 71, such that the filter elements are made essentially self-cleaning by such vibration.

Figure 3:
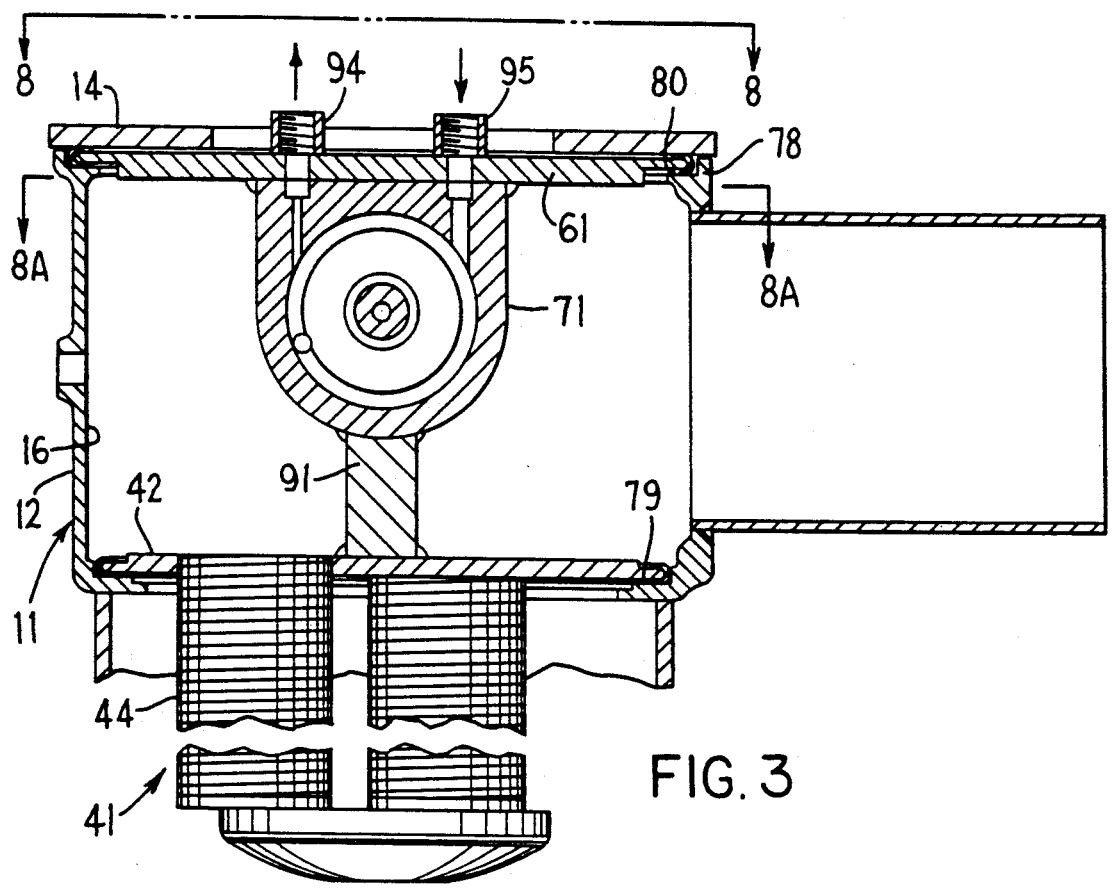
FIG. 3 is an enlarged fragment of FIG. 2.
Figure 4:
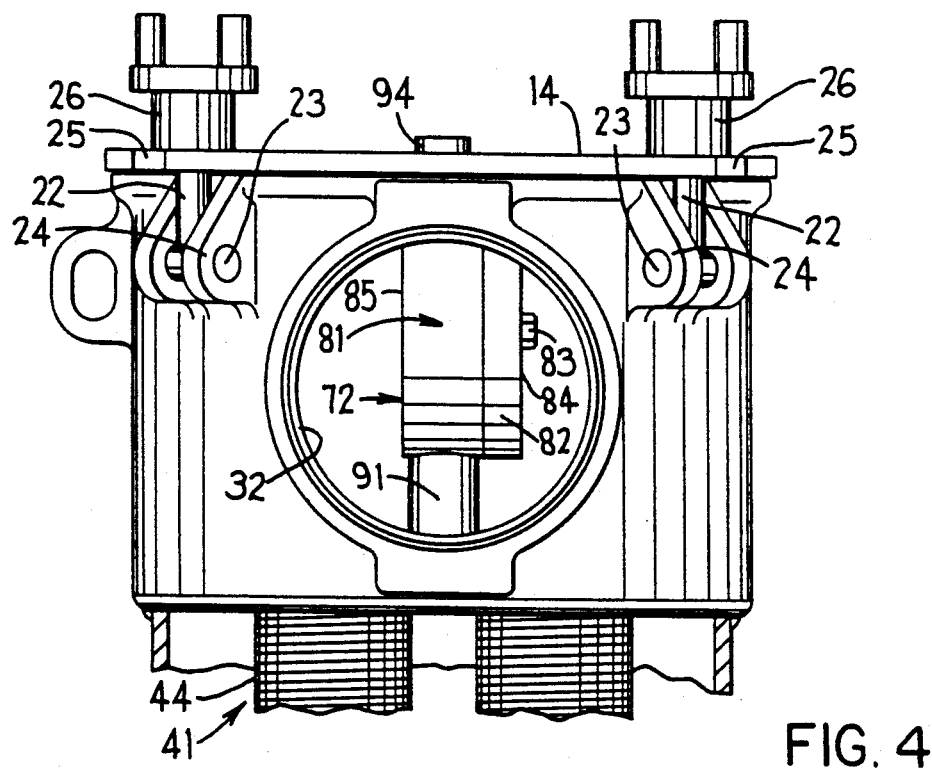
FIG. 4 is an enlarged fragment of the top portion of FIG. 1.
Figure 7:
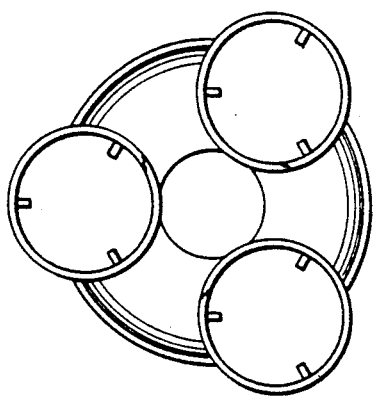
FIG. 7 is a sectional view substantially taken on the line VII—VII of FIG. 5 and showing the top of the bottom end cap of the filter element array.
Figure 8A:
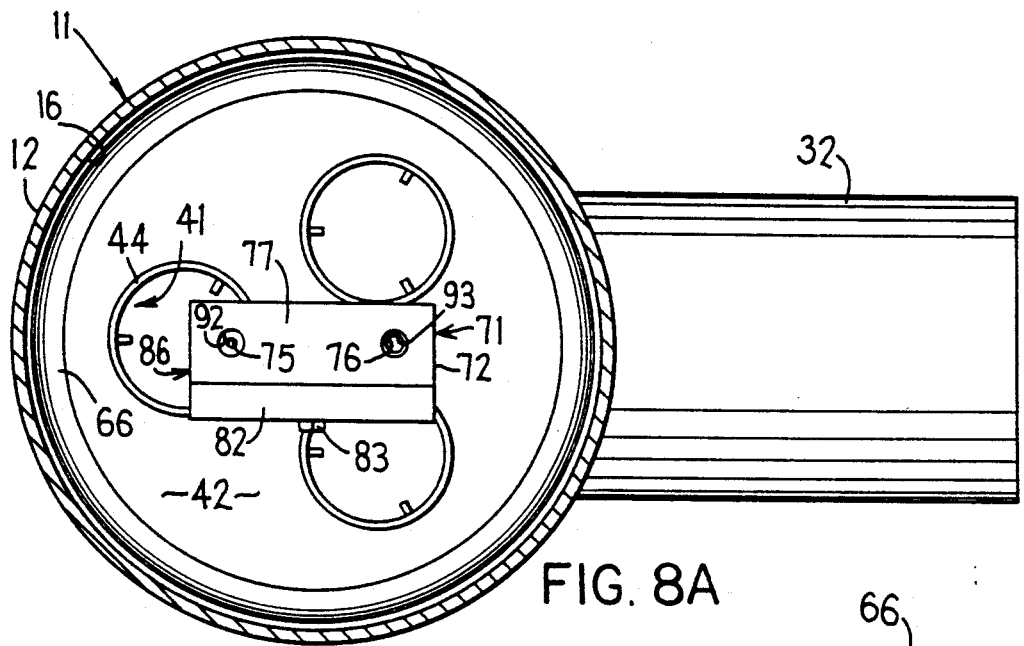
FIG. 8A is a sectional view taken on the line VIIIA—VIIIA of FIG. 3.

Filtered liquid flows up out of the open tops of the filtered elements 44 and into the upper (outlet) chamber 16. Of the three filter elements 44 shown, two, as seen in FIG. 8A preferably have outlets near and equidistant from the housing outlet 32 so as to have direct unimpeded flow up and rightward directly into the outlet 32. In the embodiment shown, the upward opening outlet of the third filter element 44, located to the left of the other two in FIG. 8A, opens upward into the leftward portion of the outlet chamber 16 behind the post 61 and vibrator 71, and below the latter. However, the small diameter of the post 91 and the small thickness of the vibrator 71, compared to the diameter of the outlet chamber 16, allows free and largely unimpeded flow of filtered liquid up into the chamber 16 and rightwardly around the post 91 and vibrator 71 and thence rightward out the liquid outlet 32. The arrows in the upper chamber 16, seen in FIGS. 1 and 8A, generally indicate the character of the flow. Centering the post 91 and vibrator 71 on the length axis of the array of filter elements 44 creates the maximum width of flow passage from the leftward filter element past the post 91 and vibrator 71 so as not to impede such flow to the outlet 32. As seen in FIG. 3, for at least a third of the height of the outlet chamber 16, only the small diameter post 91 is in the way of flow from the leftmost filter element outlet to the liquid outlet 32. Further, only the small thickness dimension of the vibrator 71 opposes left to right flow from the leftward filter element to the liquid outlet 32 and it is the larger, width dimension that parallels the general left to right direction of flow. Moreover, there is a space on each side of the vibrator 71 (to the right of it and to the left of it in FIG. 4 and thus behind it and in front of it in FIG. 3) that is almost as wide as the maximum diameter of the outlet pipe at 32.

Accordingly, the presence of the vibrator 71 and post 91 has only minimal, if any, influence on the flow of filtered liquid through the outlet chamber 16.

Even when the gelatin-like E-coat is being filtered, it is free to pass with minimum obstruction through the outlet chamber 16. The outlet chamber 16 is free of the support rods, energy supply hoses or cables, etc. found in various prior systems, on which the filtered E-coat would undesirably tend to shear, or agglomerate. The chamber 16 is rounded in plan and provided with an outlet diameter almost equal to the height of the chamber itself, to minimize interference with flow of filtered E-coat from the outlet chamber 16. The upper and lower perimeter portions of the chamber 16, particularly the upper and lower left corners seen in FIG. 3, experience mild turbulence, sufficient to tend to prevent stagnation of E-coat there.

The vibration of the vibrator casing 72, post 91 and bottom and top plates 42 and 61 is experienced in the outlet chamber 16 and tends to prevent such stagnation.

Although the cartridge, and particularly the filter elements 44, tend to self-clean, due to the action of the vibrator 71 and the particular configuration of the cartridge 41 incorporating it, it may be desired from time to time to remove the cartridge 41 for inspection, deep cleaning or repair. This is readily accomplished, simply by disconnecting the fittings 94 and 95 from the compressed gas supply P and exhaust means E and loosening the pivot toggles 21 and removing the cover 14, whereupon the cartridge 41 is removable as a unit from the housing 11.

MODIFICATION

Figure 11:
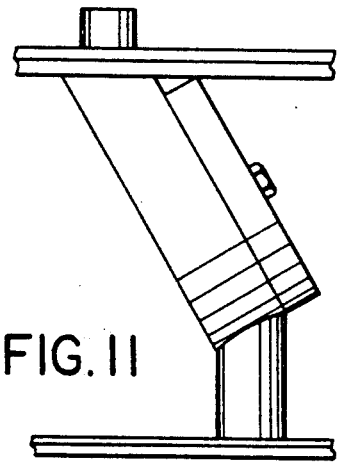
FIG. 11 is a fragment of FIG. 6, but showing a modification.
Figure 10:
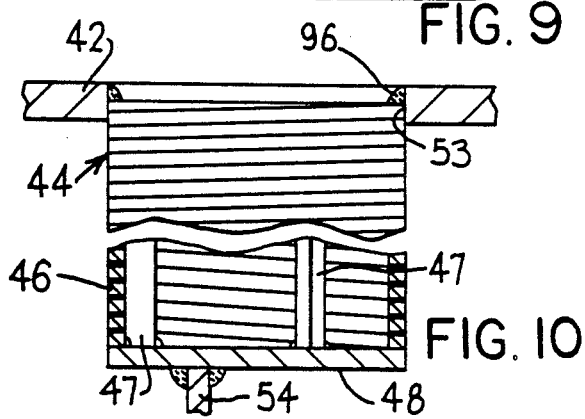
FIG. 10 is an enlarged, partially broken fragment of FIG. 5 showing top and bottom details of a filter element.

Within the broader aspects of the invention, it is contemplated that the vibrator 71 may be tilted out of the vertical plane by as much as 60°. An example is shown in FIG. 11. The purpose is to convert a portion of the vertical component of vibratory energy to horizontal vibratory energy. Some, though obviously a lesser amount, of vertically directed vibratory energy remains.

It is contemplated in the broader scope of the invention that other vibrator power sources (electrical, mechanical, etc.) might, in the broadest scope of the invention, be employed. Similarly, in the broader scope of the invention, eccentric movement of an inertia mass may otherwise be provided, for example by rotation of a crank arm carrying an inertia mass on its free outer end for rotation within a hollow chamber in a vibrator housing.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A vibrating filter for removal of unwanted solids from sticky liquids, particularly including modern base coat paint applied by means of electrostatic dip tanks to automobile bodies prior to application of a finish coat paint thereto, comprising:

a substantially vertical housing having a removable cover at one end thereof, said housing having an inlet for process liquid to be filtered and an outlet for filtered liquid, said housing having a first annular step at said one end thereof and an annular second step spaced intermediate said one end of said housing and an opposite end thereof, said second step dividing said housing into a filter chamber and a vibrator chamber;

first and second plates supported on said first and second steps respectively;

a filter element in said filter chamber and fixed to and opening through said second plate and into said vibrator chamber, said second plate separating said chambers;

and second U-section resilient rings surrounding and fitted over the periphery of said first and second plates respectively for (1) sealing said vibrator chamber from said filter chamber and from the environment outside the housing, and (2) resiliently supporting both said plates with respect to said first and second housing steps respectively;

means rigidly fixing said first and second plates together in spaced relation, said means comprising a vibrator having a rigid hollow casing and an inertia mass movable eccentrically within said casing along an internal path in a generally upstanding plane, said vibrator casing being rigidly fixed to and abutting and protruding from the inner face of said first plate, said vibrator being spaced from said second plate, a post spanning the space between the vibrator casing and second plate, said post rigidly connecting the bottom of said vibrator casing to said second plate, said vibrator casing and post being centrally fixed to said plate.

2. The apparatus of claim 1 in which said internal path of said vibrator casing defines a closed loop in a plane angled with respect to said plates.

3. The apparatus of claim 2 in which said plane is substantially vertical and substantially perpendicular to said first plate.

4. The apparatus of claim 1 in which said vibrator casing has energy supply passages for actuating said inertia mass to eccentric movement and communicating directly through respective aligned passages through said first plate and through opening means in said cover to the outside.

5. The apparatus of claim 4 in which said opening means in said cover comprises a central through hole whose periphery loosely surrounds said passages in said first plate for allowing connection of said passages in said first plate with a compressed air supply and exhaust means.

6. The apparatus of claim 1 in which said cover lies atop said first plate and engages said first U-section ring to seal said one end of said housing yet allow vibratory movement of said first plate with respect to said housing and cover.

7. The apparatus of claim 1 in which said vibrator, post, plates and filter element constitute a cartridge removable as a one-piece unit from said filter housing upon removal of said end cover and vibratable as a one-piece unit.

8. The apparatus of claim 1 in which said filter element comprises a set of three filter element tubes depending into the lower part of said housing and closely laterally spaced to each other in an equilateral triangular manner, the bottoms of said tubes being closed, an upwardly concave, shallow bowl-shaped member underlying said tubes and having an upstanding periphery rigidly fixed to shaped member and the set of three tubes being substantially coaxially arranged with respect to each other, the tubes being circumscribed by and in turn circumscribing respective coaxial outer and inner imaginary circles, the diameter of said bowl-shaped member being intermediate the diameters of said imaginary inner and outer circles, said bowl-shaped member having a central opening through the depending bottom portion thereof, said central opening being of approximately the diameter of the smaller of said imaginary circles, said bowl-shaped member constituting a thin rigid annular shell facing convexly downward and concavely upward, the shell sloping gradually upward and radially outward from said central opening thereof to direct incoming process liquid flow upward and outward along the outer surface of said shell and upward and radially outward along the inner surface of said shell to direct flow evenly to the outer surfaces of said filter tubes.

9. A vibrating filter for removal of unwanted solids from sticky liquids, particularly including modern base coat paint applied by means of electrostatic dip tanks to automobile bodies prior to application of finish coat paint thereto, comprising:

a housing;

a top plate and a bottom plate spaced therebelow in said housing and defining an outlet chamber vertically therebetween, at least one filter element depending from said bottom plate into a filter chamber defined below said bottom plate in said housing, said housing having a process liquid inlet into said filter chamber and a filtered liquid outlet from said outlet chamber;

a vibrator having a casing including front and rear faces and a peripheral face in turn having a flat top portion fixed flush against the underside of said top plate adjacent the center thereof, said vibrator including an inertia mass movable in a closed orbit in said casing, said orbit defining a plane at an angle to said top plate, pressure fluid inlet and outlet passages extending generally tangentially from opposite sides of said orbit up through said flat portion of said casing periphery and communicating with corresponding passages through said top plate for respective connection to a pressure fluid source and exhaust means outside said housing;

a rigid post depending bottom of said vibrator casing and connecting same rigidly to the top of said bottom plate;

resilient means mounting said top and bottom plates in said housing.

10. The apparatus of claim 9 in which said casing and post define a central column fixedly joining said top and bottom plates and extending substantially vertically therebetween.

11. The apparatus of claim 9 in which the bottom half of said vibrator casing is convexly curved generally downward to in effect taper down into said post, said post having a substantially smaller maximum horizontal cross section than said vibrator casing to minimize flow restriction therepast.

12. The apparatus of claim 11 in which said vibrator casing has substantially flat front and rear faces spaced by substantially less than the diameter of said casing so as to minimize flow restriction between the top of said filter elements and said outlet.

13. The apparatus of claim 12 in which said filter element comprises three filter element tubes with top ends opening up through said bottom plate, two of said tubes being laterally close to said outlet, the remaining one tube being laterally remote from said outlet but with a clear flow path to said outlet through said outlet chamber on opposite sides of said post and past said front and rear faces of said vibrator casing.

14. The apparatus of claim 9 in which the closed orbit is substantially circular and in the form of a toroidal passage, said orbit plane being vertical so movement of said mass through said orbit urges said casing to vibrate both in a horizontal direction and in a vertical direction.

15. The apparatus of claim 9 in which said resilient means comprises a C-section annular resilient member snugly covering the periphery of each of said plates.

16. The apparatus of claim 9 in which the axially opposed faces of the peripheral portions of the top and bottom plates are relieved to form a radially outwardly facing circumferential step and so that the outer peripheral portion of each of said plates is axially thinner than the central portion thereof, said resilient means mounting said top and bottom plates comprising respective first and second U-section resilient rings surrounding and fitted over the reduced thickness outer peripheral portion of said top and bottom plates respectively, said housing having upward facing first and second steps upon which said first and second U-section resilient rings support said top and bottom plates.

17. The apparatus of claim 16 in which said vibrator, post, plates, rings and filter element define a cartridge removable as a one-piece unit from said filter housing.

18. A vibrating filter for removal of unwanted solids from sticky liquids, particularly including modern base coat paint applied by means of electrostatic dip tanks to automobile bodies prior to application of a finish coat paint thereto, comprising:
   a housing;
   a top plate and a bottom plate spaced therebelow in the housing and defining an outlet chamber vertically therebetween, at least one filter element depending from said bottom plate into a filter chamber defined below said bottom plate in said housing, said housing having a process liquid inlet into said filter chamber and a filtered liquid outlet from said outlet chamber;
   resilient means mounting top and bottom plate to said housing;
   a casing including front and rear
   a vibrator having a casing including front and rear faces and a peripheral face in turn having a flat top portion fixed flush against the underside of said top plate adjacent the center thereof;
   a rigid post depending from the bottom of said vibrator casing and connecting same rigidly to the top of said bottom plate, said vibrator being of the kind having an inertia mass movable eccentrically therewithin to cause vibratory movement of the vibrator casing, said casing and post defining a central column fixedly joining said top and bottom plates and extending substantially vertically therebetween, the bottom half of said vibrator casing being convexly curved generally downward to in effect taper down into said post, the front and rear faces of said vibrator casing being substantially flat, the thickness of said vibrator casing between said front and rear faces being substantially less than the radius of said outlet chamber, the maximum thickness of said post being no more than the thickness of said vibrator casing, the height of the post being at least a third the height of the outlet chamber, the flat front and rear faces of the vibrator casing defining planes substantially parallel and straddling the length axis of the filtered liquid outlet from said outlet chamber, the outlet chamber having the shape of an upstanding right circular cylinder from which the filtered liquid outlet protrudes radially, the diameter of said cylinder substantially exceeding the width and thickness of said vibrator casing, the diameter of said chamber substantially exceeding the combined height of said vibrator casing and post, said at least one filter element opening through said bottom plate into said chamber behind said post, namely on the side of said post opposite said outlet, such that a flow of filtered liquid rising out of the top of the last mentioned filter element behind said post can easily and with little restriction flow upward and forward toward said outlet through the relatively wide aisles on opposite sides of said post and vibrator, so as to avoid interference with the passage of such liquid through said outlet chamber despite the central location of the vibrator and post therein.

* * * * *

UNITED STATES PATENT AND TRADEMARK OFFICE
CERTIFICATE OF CORRECTION

PATENT NO. : 5,084,176
DATED : January 28, 1992
INVENTOR(S) : Scott J. DAVIS et al It is certified that error appears in the above-identified patent and that said Letters Patent is hereby corrected as shown below:

Column 1, line 19; change "noses" to ---hoses---.

Column 1, line 23; change "shows development" to ---shows a later development---.

Column 8, line 24; change "together preferably by welding)" to ---together (preferably by welding)---.

Column 11, line 26; change "and second" to ---first and second---.

Column 11, line 45; change "fixed to said plate" to ---fixed to said plates---.

Column 12, line 13; change "fixed to shaped member" to ---fixed to the bottom of said tubes, said bowl-shaped member---.

UNITED STATES PATENT AND TRADEMARK OFFICE
CERTIFICATE OF CORRECTION

PATENT NO. : 5,084,176

DATED : January 28, 1992

INVENTOR(S) : Scott J. DAVIS et al

It is certified that error appears in the above-identified patent and that said Letters Patent is hereby corrected as shown below:

. . .Continued:

Column 12, line 60; change "post depending bottom" to ---post depending from the bottom---.

Column 14, line 5; change "mounting top and" to ---mounting said top and---

Column 14, line 7; delete "a casing including front and rear".

Signed and Sealed this

Twenty-first Day of September, 1993

Attest:

BRUCE LEHMAN

Attesting Officer     Commissioner of Patents and Trademarks